F. A. JEWETT.
Carriage-Spring.
No. 15,567.
Patented Aug. 19, 1856.
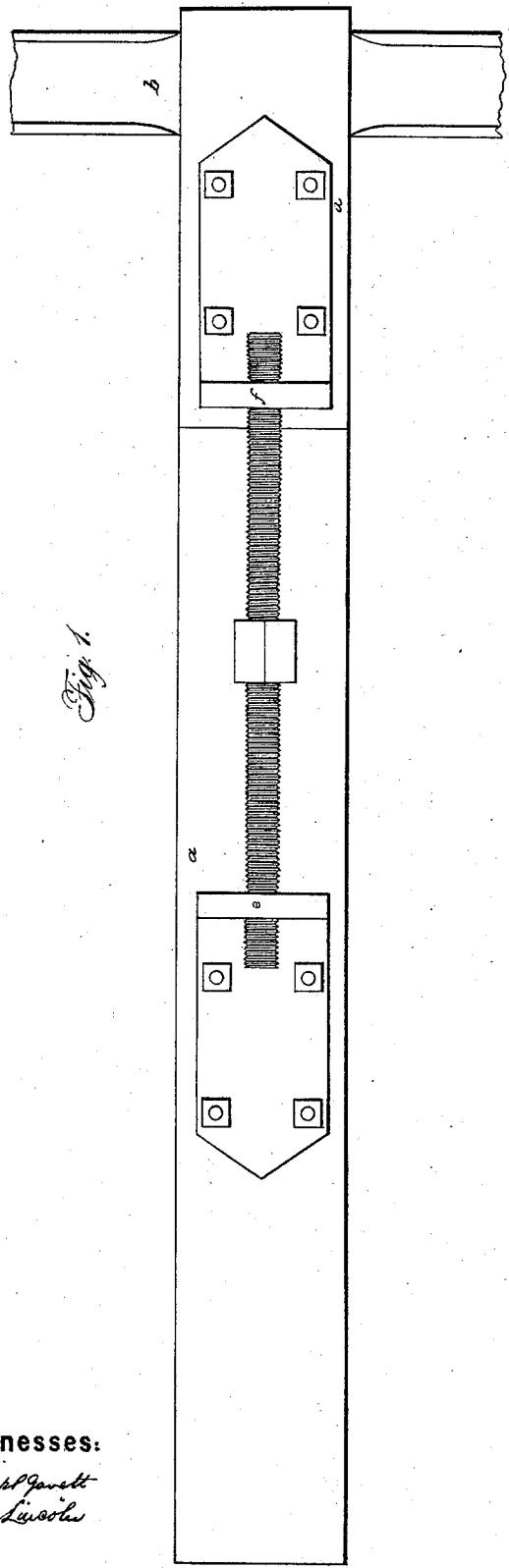
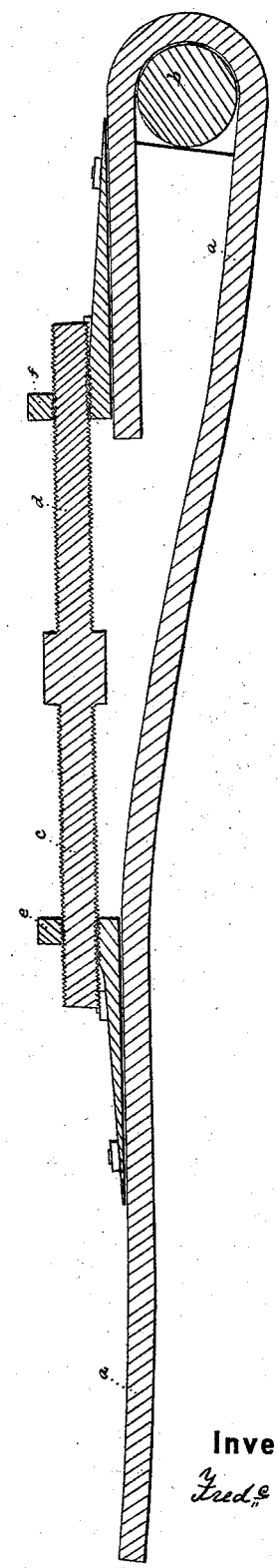
Witnesses:
Inventor:

UNITED STATES PATENT OFFICE.

FREDC. A. JEWETT, OF ABINGTON, MASSACHUSETTS.

THOROUGH-BRACE FOR CARRIAGES.

Specification of Letters Patent No. 15,567, dated August 19, 1856.

*To all whom it may concern:*

Be it known that I, F. A. JEWETT, of Abington, in the county of Plymouth and State of Massachusetts, have invented certain new and useful Improvements in Thorough-Braces Used in Hanging Carriage-Bodies, and that the following description, taken in connection with the accompanying drawings hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a view of the under side of a thorough brace with my improvements applied thereto. Fig. 2 is a central vertical section of the same.

My improvements consist in combining with a thorough-brace used for hanging carriage bodies, a right and left threaded screw, whereby the thorough-brace, when it becomes loose or stretched, can be tightened and the slack taken up at the same time, by simply turning the screw shaft. In the mode heretofore employed for setting up or tightening thorough-braces, it has been necessary to make holes in the same, at short intervals apart, which weakens the thorough-brace, as the space intervening between the holes often tears and breaks. By my improvements the thorough-brace can be tightened and set up with the greatest ease, while its strength is unimpaired, as no holes are made in it.

$a$ $a$ in the drawings represents the thorough brace, and $b$ the support upon which it is hung. To the underside of the thorough-brace is attached a right and left threaded screw $c$—$d$, that works through two elbow-nuts $e$—$f$, fastened securely to the thorough-brace, as shown in the drawings.

By turning the right and left threaded screw shaft $c$—$d$ in the proper direction, it will be seen, that while the fixed nut $e$ draws up and tightens the thorough-brace $a$ $a$ the other nut $f$ is taking up the slack around the support $b$, so that the thorough-brace can be set up a large or small distance at pleasure, and will be held in position by the screw. By this mode the thorough-brace is not weakened in any degree, as necessarily occurs in the manner in which they have been made, heretofore.

Having thus described my improvements I shall state my claims as follows:

What I claim as my invention and desire to have secured to me by Letters Patent is—

Combining with a thorough-brace a right and left threaded screw working in the nuts $e$, $f$, substantially as described, whereby the thorough-brace can be tightened, and the slack taken up at the same time, as set forth.

FREDC. A. JEWETT.

Witnesses:
JOSEPH GAVETT,
EZRA LINCOLN.